(12) United States Patent
Sujatha et al.

(10) Patent No.: US 9,429,133 B2
(45) Date of Patent: Aug. 30, 2016

(54) METHOD AND APPARATUS FOR GENERATING AN ION CURRENT BETWEEN ELECTRODES OF A SPARK PLUG

(71) Applicant: BorgWarner BERU Systems GmbH, Ludwigsburg (DE)

(72) Inventors: Arun Sasikumar Sujatha, Ludwigsburg (DE); Ganghua Ruan, Ludwigsburg (DE); Stefan Heinzelmann, Talheim (DE); Dirk Wüstenhagen, Auma-Weidatal (DE); Ulrich Schönauer, Eggenstein-Leopoldshafen (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 193 days.

(21) Appl. No.: 14/063,644

(22) Filed: Oct. 25, 2013

(65) Prior Publication Data

US 2014/0116382 A1    May 1, 2014

(30) Foreign Application Priority Data

Oct. 30, 2012  (DE) .................. 10 2012 110 386
Dec. 14, 2012  (DE) .................. 10 2012 112 273

(51) Int. Cl.
*F02P 5/04*    (2006.01)
*F02P 3/08*    (2006.01)
(Continued)

(52) U.S. Cl.
CPC ............. *F02P 5/04* (2013.01); *F02P 3/0892* (2013.01); *F02P 17/12* (2013.01); *G01L 23/221* (2013.01);
(Continued)

(58) Field of Classification Search
CPC ...... F02P 5/04; F02P 2017/125; F02P 17/12; F02P 5/152; F02P 2017/128; F02P 3/0892; F02P 5/1522; F02D 35/021; F02D 2200/101; F02D 35/027; G01L 23/221
USPC .......... 123/406.12, 596, 597, 604, 605, 654, 123/656; 324/380, 382; 73/35.08
See application file for complete search history.

(56) References Cited

U.S. PATENT DOCUMENTS 6,498,490 B2    12/2002  Karau et al.
7,005,855 B2    2/2006   Zhu et al.
(Continued)

FOREIGN PATENT DOCUMENTS

EP    2 166 659 A2    3/2010

*Primary Examiner* — Stephen K Cronin
*Assistant Examiner* — Xiao Mo
(74) *Attorney, Agent, or Firm* — Bose McKinney & Evans LLP

(57) ABSTRACT

The invention relates to a method for generating an ion current which occurs as a direct current between a central electrode and one or more side electrodes of a spark plug of a spark ignition engine which is supplied repeatedly with an ignition voltage from an ignition voltage source, wherein the spark ignition engine is assigned an engine control unit, which, in an engine cycle, determines for each spark plug a target ignition point and/or an activation point for the ignition voltage source before the target ignition point, and a second voltage source is provided, which delivers a second voltage for the generation of the ion current, wherein the second voltage source lying in the engine cycle for a first time interval $\Delta t_1$, which is shorter than the duration of the engine cycle, is connected to the electrodes of the spark plug, and wherein the ion current flowing as a result of the application of the second voltage to the electrodes of the spark plug takes a path which avoids the ignition voltage source.

28 Claims, 3 Drawing Sheets

(51) Int. Cl.
  *F02P 17/12* (2006.01)
  *G01L 23/22* (2006.01)
  *F02P 5/152* (2006.01)
  *F02D 35/02* (2006.01)
(52) U.S. Cl.
  CPC ....... *F02D 35/021* (2013.01); *F02D 2200/101* (2013.01); *F02P 5/152* (2013.01); *F02P 2017/125* (2013.01); *F02P 2017/128* (2013.01)

(56) References Cited

U.S. PATENT DOCUMENTS

| 7,878,177 | B2 | 2/2011 | Czekala et al. |
| 8,116,106 | B2 | 2/2012 | Djenguerian et al. |
| 2009/0078234 | A1* | 3/2009 | Barrett ................ F02P 5/1522 123/406.37 |
| 2011/0016952 | A1* | 1/2011 | Heinzelmann ........ F02D 35/027 73/35.08 |

* cited by examiner

METHOD AND APPARATUS FOR GENERATING AN ION CURRENT BETWEEN ELECTRODES OF A SPARK PLUG

RELATED APPLICATIONS

This application claims priority to DE 10 2012 112 273.3, filed Dec. 14, 2012, and DE 10 2012 110 386.0, filed Oct. 30, 2012, both of which are hereby incorporated by reference in their entireties.

BACKGROUND

The present invention relates to a method and an apparatus for generating an ion current which occurs as a direct current between a central electrode and one or more side electrodes of a spark plug of a spark ignition engine which is supplied repeatedly with an ignition voltage. Such a method is generally described in U.S. Pub. No. 2011/0016952 A1.

With the known method, an ion current is generated that flows as a direct current between a central electrode and one or more side electrodes of a spark plug of a spark ignition engine which drives a vehicle. The vehicle has an engine control unit, which in each engine cycle, that is to say in each operating cycle of the spark ignition engine, determines a target ignition point for each spark plug. In order to generate an ion current, besides the ignition voltage source, disclosed as an ignition coil in US 2011/0016952 A1, a second voltage source is also provided, which continuously delivers a DC voltage between 30 V and 500 V. As a second voltage source, US 2011/0016952 A1 discloses a DC voltage transformer (DC-DC converter), which generates the desired second voltage from the on-board power supply voltage of 12 V. The second voltage applied continuously to the spark plug is superimposed by the ignition voltage during the ignition process, only, and is to enable a signal evaluation during the entire operating cycle of the spark ignition engine.

A high-voltage diode, which allows the ion current to pass, but protects the DC voltage transformer from the high ignition voltage, is arranged in the electrical line between the DC voltage transformer and the spark plug. A low-voltage diode, which allows the high ignition voltage to pass, but blocks the ion current, is arranged between the secondary winding of the ignition coil and the central electrode of the spark plug.

The ion current produced has to be amplified and filtered in a number of stages before it can be examined for anomalies, for example for knocking, auto-ignition or pre-ignition.

The apparatus known from US 2011/0016952 A1 is relatively complex and cannot be integrated into an ignition coil. If the apparatus cannot be integrated into an ignition coil or if a common assembly cannot be formed from the ignition coil and the apparatus for generating and measuring ion current, the influence of interferences on the ion current signals increases and requires further filtering.

An apparatus for generating and measuring an ion current, which flows between the electrodes of a spark plug, is known from U.S. Pat. No. 6,498,490 B2. This apparatus has a capacitor which serves as a voltage source for the generation of the ion current and which is charged via the secondary winding of an ignition coil. The ion current that is to be measured and examined for anomalies flows through the secondary winding of the ignition coil. This not only has the disadvantage that the ion current produced has to be filtered in a complex manner, but also has the further disadvantage that the inductance of the secondary winding damps the ion current signal. The damping pertains particularly to the frequency range in which knocking occurs. The damping hinders the detection of anomalies of the combustion processes in the engine and in particular hinders the detection of knocking.

U.S. Pat. No. 7,878,177 B2 discloses an internal combustion engine, in which ignition coils and fuel injectors are powered by the same high-voltage source which generates the ion currents flowing between electrodes of ignition plugs. An engine control unit controls a plurality of switches which connect the high-voltage source with the fuel injectors, ignition coils and spark plugs at individual times.

SUMMARY

The present invention provides an alternative method for generating an ion current between the electrodes of a spark plug. The alternative method should be particularly well suited for determining anomalies in the combustion process, in particular for determining knocking, but, where possible, also for determining auto-ignition and preignition. Also taught herein is an apparatus necessary for carrying out the method that is sufficiently compact that it can be combined with an ignition coil to form an assembly.

The method according to this disclosure is used to generate an ion current which occurs as a direct current between a central electrode and one or more side electrodes of a spark plug of a spark ignition engine which is supplied repeatedly, specifically in each engine cycle, with an ignition voltage from an ignition voltage source. For each spark plug of the spark ignition engine, an engine control unit determines a target ignition point and/or an activation point for the ignition voltage source lying before the target ignition point. With use of an ignition coil as an ignition voltage source, the activation point is that point within an engine cycle at which the process for charging the ignition coil begins. This point can be determined by the engine control unit, and the charging can be started by a control signal, for example by the rising flank of the control signal, which closes a switch, for example a semiconductor switch, whereby the primary winding of the ignition coil is supplied with a voltage from the on-board power supply of a vehicle in which the spark ignition engine is located. For the generation of the ion current, a second voltage source supplies a second voltage to the spark plug and causes an ion current when ions are present in the combustion chamber of the engine in the region of the electrodes of the spark plug. The ion current is generated by a second voltage source such that the ignition voltage source need not also provide the voltage for the generation of the ion current. The second voltage source provided for the generation of the ion current is not connected continuously to the electrodes of the spark plug, but is rather only connected intermittently to the electrodes of the spark plug when the engine is running, specifically for a first time interval $\Delta t_1$, which is shorter than the duration of the engine cycle. This time interval $\Delta t_1$ does not have to be constant, but can be of different length. Beyond the first time interval $\Delta t_1$, it is possible to store electrical energy in the second voltage source, by which the ion current is generated in the first time interval $\Delta t_1$. This ion current takes a line path which avoids the ignition voltage source.

This disclosure teaches a number of advantages:

The generation of the second voltage, which is a prerequisite for the production of an ion current between the electrodes of the spark plug, is implemented separately and independently of the generation of the ignition voltage. This is a key prerequisite for not having to take measures to protect the second voltage source from the high voltage of the ignition voltage source.

The feature that the second voltage source is connected to the electrodes of the spark plug only in first time intervals $\Delta t_1$, which are shorter than the duration of an engine cycle, has the advantage that the second voltage, which is necessary for the generation of the ion current, does not have to be present continuously at the magnitude desired or necessary therefore. This simplifies the structure of the second voltage source, in particular under the boundary condition that the second voltage source is to be separate and independent of the ignition voltage source. In particular, it is possible in the second voltage source to provide one or more stores for the required electrical energy, which are charged outside the first time intervals $\Delta t_1$ and can feed the ion current in the first time intervals $\Delta t_1$.

The feature that the second voltage source is connected to the electrodes of the spark plug only in the first time intervals $\Delta t_1$, which are shorter than the duration of the actual engine cycle, has the advantage that the generation of the ion current can be limited to precisely that time interval with the duration $\Delta t_1$, in which, according to experience, anomalies of the combustion process may occur and may be observed. Time intervals in which the charge carrier density in a combustion chamber of the engine is too low to generate a significant ion current, and time intervals in which the ignition voltage breaking down during ignition is still much higher than the second voltage can be selectively excluded as required, which facilitates the measurement of the ion current and the evaluation of the measured ion current, saves electrical energy, which in turn facilitates the dimensioning of the second voltage source, and creates more time for the recharging of the second voltage source, whereby the voltage thereof can again be raised to the desired value.

The start of the first time interval $\Delta t_1$ is preferably controlled in accordance with the ignition point or in accordance with the activation point of the ignition voltage source. It is known that the ignition point and/or the activation point of the ignition voltage source can be determined by an engine control unit. The control signal coming from the engine control unit for this purpose can also be used in accordance with the invention to control the start of the first time interval $\Delta t_1$ and can mark directly the start of the first time interval $\Delta t_1$. However, the start of the first time interval $\Delta t_1$ is preferably controlled in such a way that it is delayed by a second time interval $\Delta t_2$ with respect to the ignition point or with respect to the moment of activation of the ignition voltage source. The start of the time interval $\Delta t_1$ can thus be set precisely where, in accordance with experience, the profile of the ion current significant for the assessment of the combustion process starts, and a section of the ion current profile which may be difficult to interpret and/or may be tainted with interference signals can be completely excluded.

The second voltage for generating the ion current is expediently set such that it is in the range from 50 V to 250 V, in particular in the range from 120 V to 240 V, better still in the range from 150 V to 200 V.

A voltage source, which comprises one or a plurality of stores for electrical energy, in particular one or a plurality of capacitors, can be used as a second voltage source. The stores are expediently charged only outside the first time interval $\Delta t_1$ in order to avoid any harmful interaction between the charging process and the discharging process of the one or more stores, which could impair the generation and measurement of the ion current.

The one store or a plurality of stores for the electrical energy may only partially discharge in the first time interval $\Delta t_1$, in particular, such that the second voltage falls by no more than 15%, preferably by no more than 10%, of its value at the start of the first time interval $\Delta t_1$. The lesser the extent to which the second voltage falls, the easier it is to compare the profile or curve of the currently measured ion current with a normal profile or curve of the ion current and to establish the presence or absence of anomalies of the combustion process on the basis of deviations between the currently observed profile or curve and the normal curve or profile of the ion current.

The second voltage, with the aid of which the ion current is generated, could be generated, as in the prior art, by means of a DC voltage transformer (DC-DC converter), which converts the on-board power supply voltage of, for example, 12 V DC voltage into a DC voltage of, for example, 150 V to 200 V. The increased second voltage is preferably generated however with the aid of a voltage multiplier, which is fed outside the first time interval $\Delta t_1$ with an AC voltage and delivers the increased second voltage as a DC voltage. In particular, a voltage multiplier that contains a cascade of asymmetrical voltage doublers is used. Such a cascade has the advantage that it can be produced easily and in a compact manner and does not cause any interferences in the ion current that would have to be filtered out again before any anomalies of the combustion process can be discovered. A cascade of asymmetrical voltage doublers consists, in each stage of the cascade, of diodes and capacitors. This has the great advantage that these capacitors can be used simultaneously as stores of the electrical energy which is required in the first time interval $\Delta t_1$ for the generation of the ion current. A separate store for the electrical energy is not required in this case, since the capacitors of the voltage multiplier perform a double function since they contribute to the voltage amplification and also store the electrical energy necessary for the ion current. This double function contributes to the fact that apparatuses for carrying out the method according to this disclosure can be formed in a compact manner.

If the spark ignition engine is installed in a vehicle, it is then assigned a battery which feeds the electrical on-board power supply. The voltage multiplier however requires an AC voltage as input voltage. The DC voltage of the battery (on-board power supply voltage) can be converted into an AC voltage by inverters. The so generated AC voltage is then supplied to the voltage multiplier. An inverter necessary for this purpose can be produced with low circuit complexity for the conventional on-board power supply voltage of 12 V and also for the less frequently used on-board power supply voltages of, for example, 24 V, 40 V and 48 V.

It has already been mentioned that the first time interval $\Delta t_1$ does not have to be constant. It is preferably variable and is preferably varied as a function of the speed of the spark ignition engine. In particular, it is shortened with increasing speed. The first time interval $\Delta t_1$ can thus be adapted to the engine cycles becoming shorter with increasing speed. The engine speed is a parameter which, in vehicles equipped with a data bus, is permanently available on the data bus, so that the engine control unit or, if present, a separate ignition control unit can access said parameter in order to control the duration of the first time interval $\Delta t_1$ according to the speed of the spark ignition engine. The control process is preferably implemented with the aid of a computing circuit, which may be provided in the engine control unit or in a separate ignition control unit. In particular, a microprocessor or a microcontroller can be used as a computing circuit. The computing circuit has a memory which it can access, or it can access an external memory, in which a number of pairs of values are stored. Each pair of values assigns a specific first time interval $\Delta t_1$ to a specific speed. If the value of the current speed of the engine is transmitted to the computing circuit, it accesses the memory in which the pairs of values are stored, ascertains or calculates from the stored pairs of values the duration $\Delta t_1$ of the first time interval belonging to the currently transmitted speed, and separates the second voltage source from the spark plug when the ascertained or calculated first time interval $\Delta t_1$ is reached. If a current speed for which no pair of values is stored, is transmitted to the computing circuit, then the computing circuit may either search for the pair of values that is closest to the currently transmitted engine speed and may change the first time interval $\Delta t_1$ to the duration specified in this pair of values, or it can determine the two closest pairs of value between which the currently submitted speed value lies, and calculate the duration of the first time interval $\Delta t_1$ matching the current speed value by a method of interpolation.

Alternatively, it is possible to change the first time interval $\Delta t_1$ as a result of access by the computing circuit, to which the current speed value is transmitted, to a memory in which a computing instruction is stored, in accordance with which the computing circuit, for the current speed value, calculates the duration of the first time interval $\Delta t_1$ and, once the end of the calculated duration of the first time interval $\Delta t_1$ is reached, separates the second voltage source from the spark plug.

It has already been mentioned that the observed actual curve or profile of the ion current can be compared with a normal curve or profile of the ion current in order to conclude whether there are any anomalies in the course of the combustion process or whether there are any deviations from an optimal combustion process on the basis of the deviations between the two curves or profiles. For this purpose, the currently observed curve or profile of the ion current is preferably stored, either in the engine control unit or in a separate ignition control unit, in which a normal curve or profile of the ion current is also stored, so that any differences between the stored current curve or profile of the ion current and the curve or profile of the ion current stored as a normal curve or profile can be determined. If significant deviations are determined, corrective action can be taken by the engine control unit or, if present, by an ignition control unit with regard to the engine control or the ignition control by forming a control variable for changing an engine parameter, which can be influenced by the engine control unit or by the ignition control unit. For example, the ignition point, the quantitative ratio of drawn-in air to injected fuel, the quantitative ratio of drawn-in air to a fed-back quantity of exhaust gas and, in the case of an engine with exhaust gas turbocharger or charge air compressor, the boost pressure are possible engine parameters.

The ion current does not have to be measured during the entire first time interval $\Delta t_1$. However, it is preferably measured and also evaluated during the entire first time interval $\Delta t_1$ in order to uncover any anomalies in the curve or profile or deviations from the optimal curve or profile of the combustion process. The ion current should not be measured for longer than it delivers usable results. This time interval can be specified by the engine control unit, preferably in a speed-dependent manner, but can also be optimized autonomously in the engine control unit or in a separate ignition control unit in that the measurement for example is then interrupted as soon as the engine control unit or, where applicable, the ignition control unit identifies, in accordance with predefined criteria, the fact that the curve of the ion current is normal, or as soon as the intensity of the ion current falls below a predefined value, for example is less than 20% or 10% of its previously observed maximum or is smaller than a predefined absolute value of the current intensity.

The duration of the second time interval $\Delta t_2$ is preferably variable and can be changed according to the speed, in particular can be shortened with increasing speed. At medium speed a duration of 0.5 ms to 1 ms from the appearance of the control signal for the start of charging of the ignition coil has proven to be of value for the time delay $\Delta t_2$.

These teachings are advantageously suitable for spark ignition engines having different ignition systems. These teachings are suitable not only for ignition systems with single-spark ignition coils, in which each spark plug is assigned an ignition coil, but are also suitable for spark ignition engines with two-spark ignition coils, which are ignition coils that simultaneously generate an ignition voltage for two spark plugs. This disclosure is also suitable for spark ignition engines with multi-spark ignition. In the case of multi-spark ignition, one ignition coil generates a close sequence of individual sparks with short charge time by being switched on and off repeatedly. Lastly, this disclosure can also be used for spark ignition engines which operate with dual-core ignition coils, that is to say ignition coils that, compared to single-spark ignition coils, deliver an extended ignition spark. A dual-core ignition is disclosed for example in DE 10 2012 106 207.2.

The present disclosure is suitable both for ignition systems that deliver a positive ignition voltage and for ignition systems that deliver a negative ignition voltage. The present disclosure is particularly suitable for ignition systems that deliver a positive ignition voltage, that is to say the central electrode of the spark plug is charged positively with respect to the one or more side electrodes. If the central electrode of the spark plug is charged positively for the ion current generation, the electrons provided as a result of the ignition in the combustion chamber then migrate to the central electrode, where they form an electron cloud, which promotes the current conduction between the central electrode and the one or more side electrodes. If the central electrode of the spark plug is poled negatively, however, then the electrons migrate to the one or more side electrodes and to the wall of the combustion chamber, which impairs the current conduction between the central electrode and the one or more side electrodes. It is therefore preferable if the central electrode of the spark plug is poled positively.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
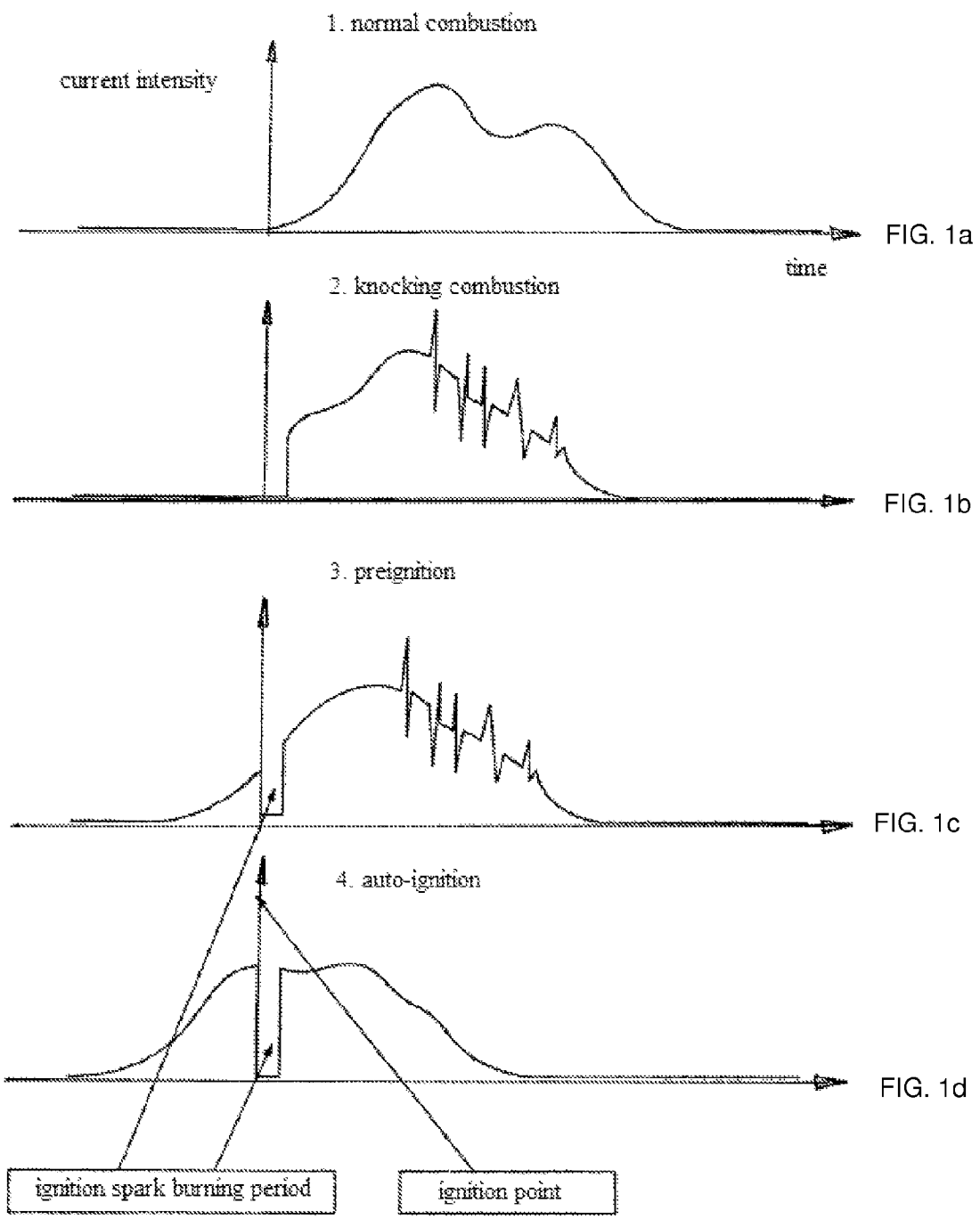
FIGS. 1a-1d show four different curves of the ion current.

FIG. 1a shows a typical curve of the ion current in a combustion chamber of a four-stroke engine under normal combustion conditions. The curve over time of the measured ion current is characterized by a smooth curve. After the ignition point, the current intensity of the ion current rises and passes through a first maximum and a second maximum, which is lower than the first maximum, and then gradually falls to zero.

FIG. 1b shows a changed curve of the ion current, which is produced as a result of the fact that the combustion is accompanied by knocking. Knocking is noticeable in the combustion chamber as a result of pressure surges that are reflected in the curve of the ion current and lead to characteristic deflections of the current intensity.

FIG. 1c shows a curve of the intensity of the ion current in the case of preignition. Reference is made to preignition when the fuel/air mixture is ignited prematurely and in an uncontrolled manner at the end of the compression phase in the spark ignition engine, before the ignition point. This is a problem that occurs predominantly in modern, highly compressing spark ignition engines. After the ignition point, additional current peaks caused by knocking can be seen in FIG. 1c.

FIG. 1d shows a curve of the intensity of an ion current with the occurrence of auto-ignition. Reference is made to auto-ignition when, in a spark ignition engine, the combustion process is not triggered or is not only triggered by the ignition spark of the spark plug, but by overheated components in the combustion chamber, for example by spark plug electrodes, exhaust valves or by sharp, overheated edges. Auto-ignitions can occur both before and after the ignition point and cause the combustion process to be initiated at a number of points. This can intensify the overheating and lead to engine damage.

The significant deviations of the currently observed ion current curve from the curve with normal combustion can be discovered by comparison of the observed curve with the curve with normal combustion and can be reduced or remedied by taking measures in the engine control.

Figure 2:
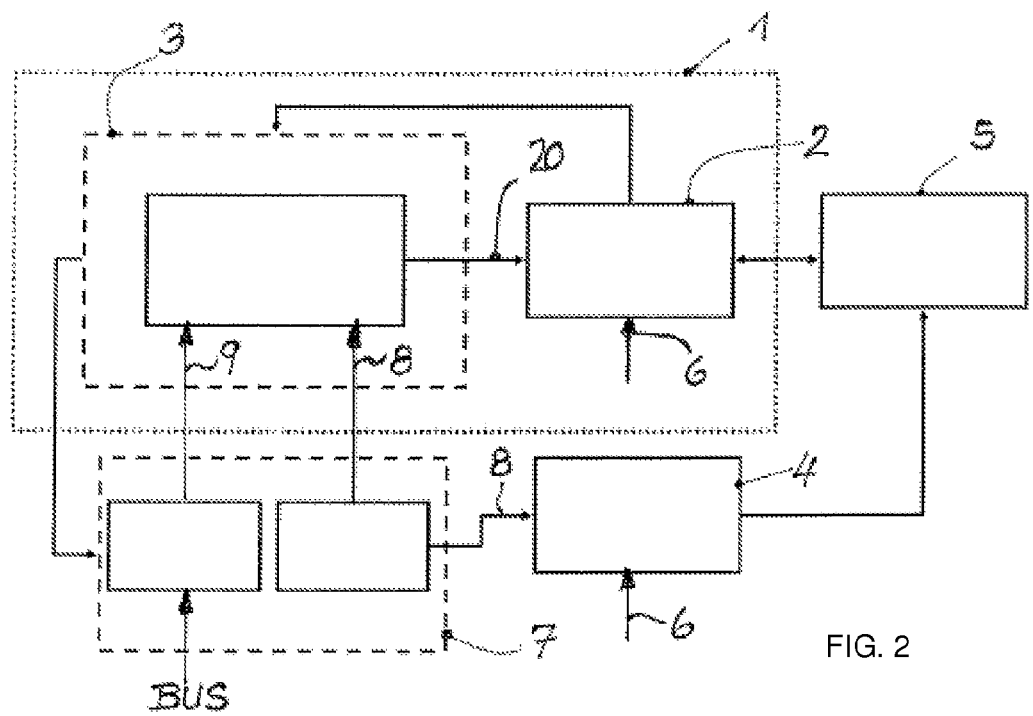
FIG. 2 shows a block diagram of a circuit arrangement for carrying out the method according to the invention.

FIG. 2 shows a system 1 for generating and measuring an ion current, said system, combined in a structural unit, containing an ion current measuring device 2 and a respective control device 3. This system 1 is assigned to an ignition coil 4, which supplies the ignition voltage for a spark plug 5. The ion current measuring device 2 is connected to a voltage source 6, for example to the on-board power supply of a vehicle, which supplies the ion current measuring device 2 with DC voltage. The same voltage source 6 can supply the ignition coil 4 with a DC voltage. The control device 3 is connected to an engine control unit 7, which for example via the so-called "terminal 1" of the vehicle delivers a control signal 8, with which the charging process of the ignition coil 4 is started and with which the control device 3 is simultaneously triggered, which then activates the ion current measuring device 2 with a time delay $\Delta t_2$ by means of an accordingly delayed control signal 20, such that this device applies the "second" voltage to the spark plug 5. This second voltage is generated in the ion current measuring device 2 from the voltage of the on-board power supply. Note: "Terminal 1" is defined in DIN 72552 as being a terminal of an ignition coil.

The control device 3, triggered by the trigger signal transmitted by the engine control unit 7, opens a time window (possibly delayed by $\Delta t_2$) for the generation and measurement of the ion current. The time window is the time interval with the duration $\Delta t_1$. The control device 3 closes the time window once the provided duration $\Delta t_1$ has elapsed, said duration being set depending on the speed of the engine. For this purpose, the control device 3, besides the control signal 8, also receives a signal 9 from the engine control unit 7 via the "terminal 1", said signal containing information concerning the current speed of the engine. At the end of the first time interval $\Delta t_1$, the control device 3 separates the spark plug 5 from the supply with the second DC voltage by the ion current measuring device 2.

The start of the first time interval having the duration $\Delta t_1$ can be delayed as required by a second time interval $\Delta t_2$ with respect to the control signal 8 of the engine control unit. The second time interval $\Delta t_2$ may, for example, be 0.5 ms to 1 ms long and can be changed in a speed-dependent manner.

The ion current measuring device 2 measures the ion current that is caused as a result of the fact that the ion current measuring device 2 supplies the spark plug 5 with the second DC voltage. The measured curve of the ion current can be compared in the ion current measuring device 2 with a stored normal curve of the ion current. The way in which such a comparison can be carried out is known to a person skilled in the art and does not form part of the subject of the present invention. The result of this comparison can be transmitted via the control device 3 to the engine control unit 7, such that the engine control unit 7 can change the engine control as necessary so that significant deviations of the ion current curve from the normal ion current curve are reduced or remedied.

Figure 3:
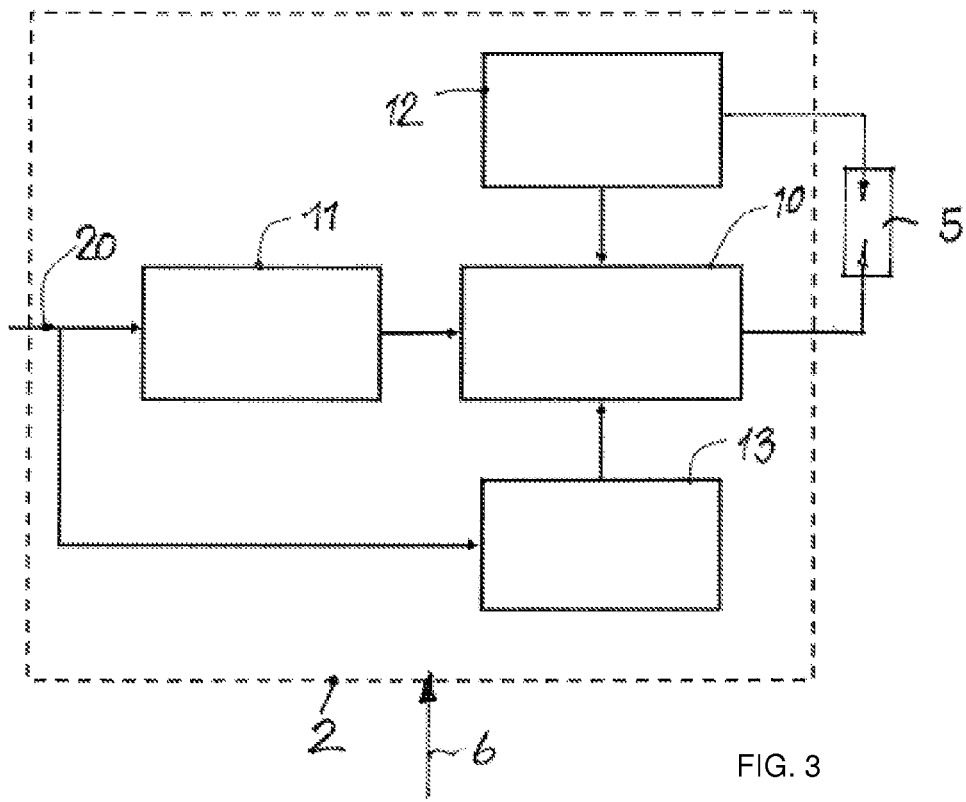
FIG. 3 shows a block diagram of a detail of the circuit from FIG. 2.

FIG. 3, in a slightly more detailed manner, shows the structure of the ion current measuring device 2 from FIG. 2. The ion current measuring device 2 contains a voltage multiplier 10, which is constructed as a cascade and, from the on-board power supply voltage, generates a higher DC voltage. The voltage multiplier 10 is driven by a driver circuit 11, which contains an inverter, with which an AC voltage is generated from the on-board power supply voltage and is fed into the voltage multiplier 10, at the output of which a DC voltage, for example of 200 V, can then be tapped and is supplied to the spark plug 5. The driver circuit 11 is controlled by the control device 3.

The ion current flowing via the spark plug 5 is measured in a measuring circuit 12 and is preferably also evaluated in the ion current measuring device 2. The evaluation preferably includes the comparison of the curve of the measured ion current with a stored normal curve of the ion current. The ion current measuring device 2 may for this purpose be equipped with a computing circuit, which can perform such an evaluation, for example with a microprocessor, microcontroller or with an ASIC. The result of the measurement or evaluation of the ion current is transmitted via the control device 3 to the engine control unit 7.

A switch 13 separates the measuring circuit 12 from the voltage multiplier 10 and from the driver circuit 11, as long as the driver circuit drives the voltage multiplier 10 in order to charge the capacitors thereof.

Figure 4:
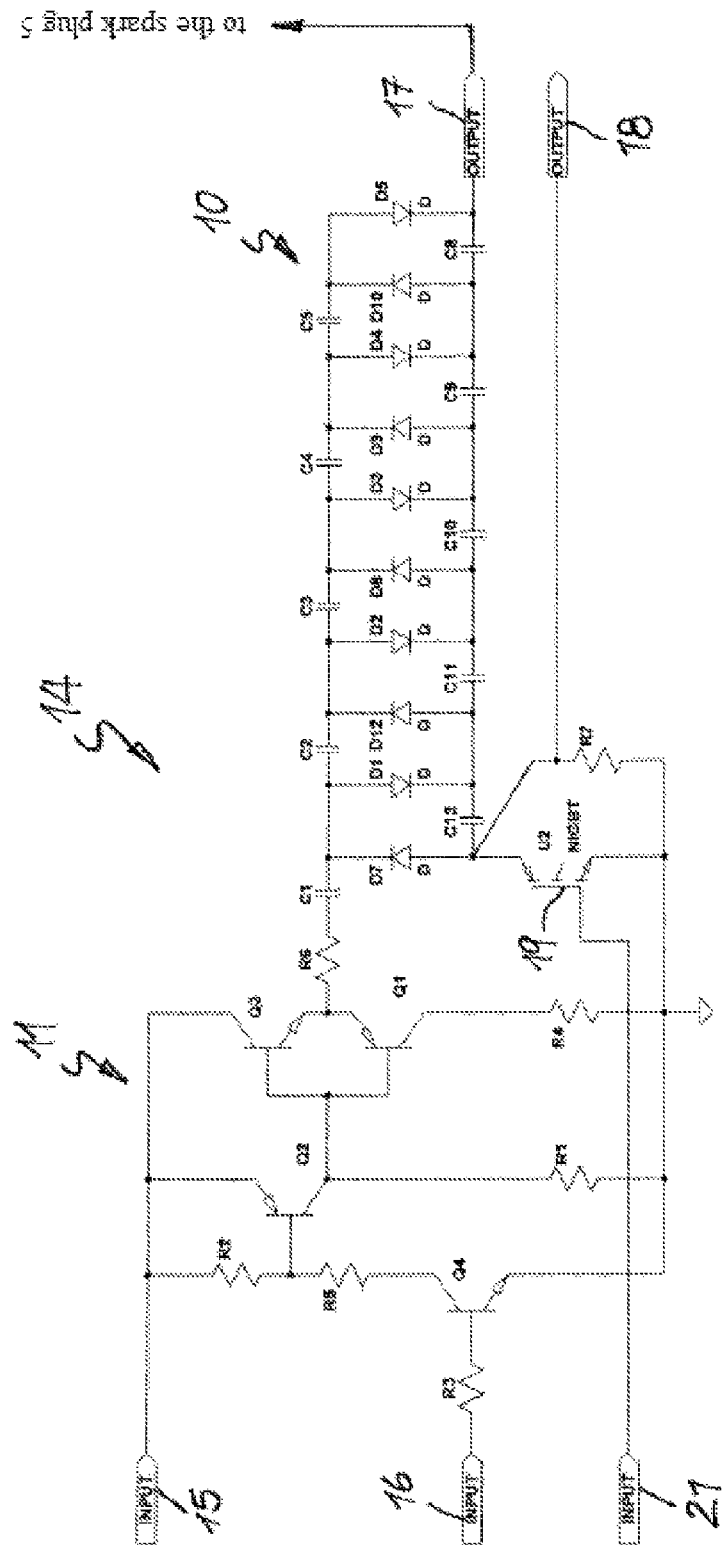
FIG. 4 shows a circuit arrangement with a voltage multiplier for use in the method according to the invention.

The circuit arrangement 14 illustrated in FIG. 4 contains a voltage multiplier 10 formed from capacitors and diodes and constructed as a cascade of asymmetrical voltage doubler circuits. The voltage multiplier 10 is fed by a driver circuit 11, which has two input terminals 15 and 16. The driver circuit 11 is exposed to the on-board power supply DC voltage of for example 40 V via the input 15. Of the 40 V, just under 4 V reach the base of a transistor Q2 via a voltage divider R2/R5. However, the voltage of 4 V is not permanently applied to the base of the transistor Q2, since the driver circuit 11 receives a pulse-width modulation signal via the input terminal 16, said signal continuously switching a transistor Q4. A rectangular wave with an amplitude of 4 V and with an offset of 36 V thus appears at the base of the transistor Q2. The transistor Q4 switches the voltage in the clock cycle of the pulse-width modulation signal to and fro between 0 V and 40 V. The output of the transistor Q2 is connected to the base of two transistors Q1 and Q3, which form a push-pull amplifier, at the output of which an AC voltage appears in rectangular shape with an amplitude of 40 V. The output of the push-pull amplifier is connected via a series resistor R6 to the input of the voltage multiplier 10. The series resistor R6 limits the intensity of the current fed to the voltage multiplier 10.

At the output terminal 17 of the voltage multiplier 14 appears the DC voltage increased with respect to the on-board power supply voltage, the increased voltage being 200 V in the present example. It is applied to the electrodes of the spark plug 5 for the duration of the first time interval $\Delta t_1$.

The ion current flowing between the electrodes of the spark plug 5 flows through a resistor R7. The voltage falling across the resistor R7 is a measure for the intensity of the ion current and can be tapped between an output terminal 18 and a ground terminal.

A bipolar transistor 19 with insulated gate electrode is connected in parallel to the resistor R7. Whilst the voltage multiplier 10 is charged, this bipolar transistor 19 is switched on and thus bridges the resistor R7. During the first time interval $\Delta t_1$ in which the ion current is generated and measured, the bipolar transistor 19 is opened however and the pulse-width modulation signal, which is otherwise fed via the input 16, is switched off. This avoids the interspersing of interference signals into the ion current and facilitates the measurement and evaluation thereof. The bipolar transistor 19 is controlled by the control signal 20, which may be delayed, see FIGS. 2 and 3. The control signal 20 comes from the control device 3 and is fed to the circuit arrangement 14 via the input terminal 21.

While exemplary embodiments have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMBERS 1 system for generating and measuring an ion current
2 ion current measuring device
3 control device
4 ignition voltage source, ignition coil
5 spark plug
6 voltage source
7 engine control unit
8 control signal
9 signal with information concerning speed
10 second voltage source; voltage multiplier
11 driver circuit
12 measuring circuit
13 switch
14 circuit arrangement
15 input terminal
16 input terminal
17 output terminal
18 output terminal
19 bipolar transistor
20 delayed controlled signal
21 input terminal
C2-C12 capacitors that form the store for the electrical energy for the ion current
Q1-Q4 transistors
R2/R5 voltage divider
R6 series resistor
R7 resistor
$\Delta t_1$ first time interval
$\Delta t_2$ second time interval

What is claimed is:

1. A method for generating an ion current between a central electrode and one or more side electrodes of a spark plug of a spark ignition engine having a plurality of spark plugs and which is supplied repeatedly with an ignition voltage from an ignition voltage source, the method comprising:
assigning an engine control unit (ECU) to the spark ignition engine;
determining with the ECU in an engine cycle for each of the spark plugs a target ignition point and/or an activation point for the ignition voltage source before the target ignition point;
providing a second voltage source;
delivering with the second voltage source a second voltage to generate the ion current; and
connecting the second voltage source to the electrodes of the spark plugs for a first time interval $\Delta t1$, which is shorter than the duration of the engine cycle;
wherein the ion current flowing as a result of the application of the second voltage to the electrodes of the spark plug follows a path which avoids the ignition voltage source.

2. The method according to claim 1, wherein the start of the first time interval $\Delta t1$ is controlled as a function of the ignition point or as a function of the activation point of the ignition voltage source.

3. The method according to claim 2, wherein the start of the first time interval $\Delta t1$ is controlled such that it is delayed by a second time interval $\Delta t2$ with respect to the ignition point or with respect to the moment of activation of the ignition voltage source.

4. The method according to claim 1, wherein the second voltage is between 50 V and 250 V.

5. The method according to claim 2, wherein the second voltage is between 120 V and 240 V.

6. The method according to claim 1, further comprising storing electrical energy in the second voltage source.

7. The method according to claim 6, wherein the second voltage source comprises one or more capacitors.

8. The method according to claim 6, wherein the second voltage source is discharged in the first time interval $\Delta t1$ by no more than 15% of its value at the start of the first time interval $\Delta t1$.

9. The method according to claim 8, wherein the second voltage source is discharged in the first time interval $\Delta t1$ by no more than 10% of its value at the start of the first time interval $\Delta t1$.

10. The method according to claim 1, wherein the second voltage source contains a voltage multiplier, which is supplied outside the first time interval $\Delta t1$ with an AC voltage and which delivers the second voltage as a DC voltage.

11. The method according to claim 10, wherein the voltage multiplier comprises a cascade of asymmetrical voltage doublers.

12. The method according to claim 10, wherein the spark ignition engine is assigned an accumulator, a DC voltage of which being converted by inverters into the AC voltage which is applied to the voltage multiplier.

13. The method according to claim 1, wherein the first time interval $\Delta t1$ is variable.

14. The method according to claim 13, wherein the first time interval $\Delta t1$ is varied as a function of speed of the spark ignition engine.

15. The method according to claim 14, further comprising:
varying the first time interval $\Delta t1$ with a computing circuit, to which actual engine speed is transmitted, the computing circuit accessing a memory, in which a plurality of pairs of values is stored
assigning, for each pair of values a specific first time interval $\Delta t1$ and a specific engine speed value;
wherein the computing circuit ascertains and calculates the first time interval $\Delta t1$ from the stored pairs of values and, once the end of the ascertained or calculated duration of the first time interval $\Delta t1$ is reached, separates the second voltage source from the spark plug.

16. The method according to claim 14, further comprising:
varying the first time interval $\Delta t1$ with the aid of a computing circuit, to which the actual engine speed is transmitted and which accesses a memory in which a calculation specification is stored;
the computing circuit, in accordance with the stored calculation specification, calculating the duration of the first time interval $\Delta t1$ based on the actual engine speed; and,
once the end of the calculated duration of the first time interval $\Delta t1$ is reached, separating the second voltage source from the spark plug.

17. The method according to claim 1, further comprising storing an observed curve of the ion current and comparing the observed curve with a curve of the ion current stored as a normal curve.

18. The method of claim 1, wherein the ion current is measured during the entire first time interval $\Delta t1$.

19. The method according to claim 1, further comprising evaluating the ion current for the entire time interval for which the ion current has been measured.

20. The method according to claim 19, further comprising the ECU changing an engine parameter influenced by the ECU based on a deviation of the curve of the ion current from a stored normal curve.

21. The method according to claim 3, wherein the duration of the second time interval $\Delta t2$ is variable.

22. The method according to claim 21, wherein the second time interval $\Delta t2$ is varied as a function of engine speed.

23. The method according to claim 22, wherein the second time interval $\Delta t2$ is shortened with increasing speed.

24. The method according to claim 1, wherein, for the generating of the ion current, the method further comprises poling the central electrode of the spark plug positively with respect to the one or more side electrodes of the spark plug.

25. The method according to claim 1, wherein, for generating of ignition sparks, the method further comprises poling the central electrode of the spark plug positively with respect to the one or more side electrodes of the spark plug.

26. An apparatus for generating an ion current between a central electrode and one or more side electrodes of a spark plug of a spark ignition engine which is supplied repeatedly with an ignition voltage from an ignition voltage source, the apparatus comprising:
an engine control unit (ECU) configured to determine during an engine cycle for each spark plug a target ignition point and/or an activation point for the ignition voltage source lying before the target ignition point; and
a second voltage source configured to provide a second voltage which generates the ion current, the second voltage source including an electrical energy storage device structured for being charged only outside the first time interval $\Delta t1$;
wherein the second voltage source is configured to be connected to the electrodes of the spark plug in every engine cycle for a first time interval $\Delta t1$, which is shorter than the duration of the engine cycle; and
wherein the ion current flowing as a result of the application of the second voltage to the electrodes of the spark plug follows a path which avoids the ignition voltage source.

27. The apparatus according to claim 26, wherein the ignition voltage source comprises an ignition coil.

28. A method for generating an ion current between a central electrode and one or more side electrodes of a spark plug of a spark ignition engine that is repeatedly supplied with an ignition voltage from an ignition voltage source, the method comprising:
assigning an engine control unit (ECU) to the spark ignition engine;
determining with the ECU in an engine cycle for the spark plug a target ignition point and/or an activation point for the ignition voltage source before the target ignition point;
providing a second voltage source that outputs a second voltage; and
connecting the second voltage to the electrodes of the spark plug for a first time interval $\Delta t1$, which is shorter than the duration of the engine cycle, thereby generating the ion current; and
charging the second voltage source at times outside the first time interval $\Delta t1$ and storing electrical energy produced by the charging;
wherein the ion current flowing as a result of the application of the second voltage to the electrodes of the spark plug follows a path which avoids the ignition voltage source.

* * * * *